(12) United States Patent
Maeda

(10) Patent No.: US 8,717,521 B2
(45) Date of Patent: May 6, 2014

(54) ADJUSTABLE REFLECTIVE DEVICE WITH MULTI-FUNCTIONAL DISPLAY

(75) Inventor: Philip Maeda, Torrance, CA (US)

(73) Assignee: Rydeen North America, Inc., Torrance, CA (US)

(*) Notice: Subject to any disclaimer, the term of this patent is extended or adjusted under 35 U.S.C. 154(b) by 109 days.

(21) Appl. No.: 13/374,106

(22) Filed: Dec. 13, 2011

(65) Prior Publication Data

US 2013/0148063 A1    Jun. 13, 2013

(51) Int. Cl.
*G02F 1/1335* (2006.01)
*G02B 5/08* (2006.01)

(52) U.S. Cl.
USPC ............ 349/113; 349/114; 359/603; 359/604

(58) Field of Classification Search
CPC .................... G02F 1/133553; G02F 1/133555; G02F 1/133371; G02F 1/133514; G02F 1/136227; B60R 1/088; B60R 1/083; B60R 1/082; B60R 1/087; B60R 1/12
USPC ............................ 349/113, 114; 359/603, 604
See application file for complete search history.

(56) References Cited

U.S. PATENT DOCUMENTS

| | | | |
|---|---|---|---|
| 5,204,778 A * | 4/1993 | Bechtel | 359/604 |
| 5,322,996 A * | 6/1994 | Black et al. | 250/214 AL |
| 7,859,738 B2 | 12/2010 | Baur et al. | |
| 7,898,398 B2 | 3/2011 | Deline et al. | |
| 7,906,756 B2 | 3/2011 | Drummond et al. | |
| 7,916,380 B2 * | 3/2011 | Tonar et al. | 359/267 |
| 7,926,960 B2 * | 4/2011 | Skiver et al. | 359/604 |
| 2009/0201137 A1 * | 8/2009 | Weller et al. | 340/425.5 |

* cited by examiner

*Primary Examiner* — Mike Qi
(74) *Attorney, Agent, or Firm* — Irving Keschner

(57) ABSTRACT

A reflective device wherein the device reflectivity is adjustable via automatic or manual means. The variable reflectance element includes a metallic mirror reflector on one side of a substrate and additional substrate layers consisting of a polarizer and a LCD whose material characteristics have been optimized for dimming. The mirror assembly provides alternate trigger mechanisms for initiating the dimming function, the dimming function being automatically referenced to ambient light levels (day or night) or manually adjusted or selected. In the automatic mode the dimming mirror assembly provides the user immediate eye protection from reflected high intensity glare by effecting near instantaneous adjustment in mirror reflectivity, such that the intensity of the reflected light impinging on the eyes is automatically adjusted so as to be at comfortable levels. The mirror assembly construction is in one piece, and allows the viewing of a display or TFT monitor located adjacent to the mirror.

12 Claims, 6 Drawing Sheets

ADJUSTABLE REFLECTIVE DEVICE WITH MULTI-FUNCTIONAL DISPLAY

BACKGROUND OF THE INVENTION

1. Field of the Invention

The present invention relates generally to a reflective device, more particularly, to such mirror systems having self-dimming mirrors and a viewable monitor placed adjacent to the reflective device for display of numerical and graphical information.

2. Description of the Prior Art

Automatic mirrors which automatically control the glare from bright headlights of rearward sources, or glare from a rearward sun near the horizon, (sun rising or setting) have been available for some time. Methods for controlling the glare reflected in these mirrors have included employment of motorized prismatic mirrors, utilization of liquid crystal shutters and use of electrochromic (EC) mirror reflective elements, wherein the reflectivity of the mirror is controlled via an applied voltage. The major problem with EC based devices is the relatively slow response time of the dimming function to the onset of the bright light source, typically in the range of several seconds. A number of systems have been proposed, such as in U.S. Pat. No. 3,601,614 issued to Platzer Jr. and U.S. Pat. No. 3,600,951 issued to Jordan et al., among others. Examples of control systems utilizing these type of devices include U.S. Pat. No. 5,715,093.

What is desired is to provide light sensors in automatic mirror control circuits which achieve enhanced performance in response time (in the range of 10 milliseconds or less) and cost benefits relative to previously achieved technology. In addition, the option of utilizing a touch screen selection and adjustment of the dimming function, as well as a toggle switch and having numerical and graphical displays viewable on monitors located behind the mirror for user information and convenience are desired features. Providing these features will enable manufacturers to offer the comfort and advantages of glare control mirrors to the public at affordable prices.

SUMMARY OF THE INVENTION

The present invention presents a method and process for utilizing commercially available, low cost, silicon-based light-sensing devices in automatically dimming mirror control systems as well as mirrors which may be dimmed by using a touch screen or toggle switch. The present invention also provides means for controlling the reflectivity of a mirrored surface of a vehicle rearview mirror which responds to the intensity of brightness of the light impinging on the mirror from a rearward source. In addition, the mirror provides the user with a numerical LCD display and graphical display of information on a monitor placed adjacent to the reflective device, preferably a thin film transistor (TFT) monitor.

The dimming mirror system of the present invention includes a twisted nematic (TN) LCD electro-optic reflective element, at least one sensor for the ambient light level, at least one sensor for the glare light level condition, and a control circuit that responds to the current ambient and glare light levels which have been measured in order to control the reflectance level of the mirror reflective element. Additionally, a touch screen or toggle switch option is provided for selecting the dimming function. The light sensors produce an output that is proportional to the light sensed by the glare and the ambient light sensors. The controller generates an output voltage amplitude level commensurate with the glare and ambient light levels sensed, with response times in the 10 millisecond range, such that the mirror reflectivity is adjusted automatically or manually so that the intensity of the reflected light seen by the user is within his/her comfort level.

The mirror system of the present invention includes an electro-optic reflective element, ambient and glare light sensors, and a circuit that generates appropriate outputs to control the reflectance level of the reflective element. This includes a charge accumulation device, a voltage difference sensing device and a controller device. The difference sensing device compares an output of the charge accumulation device with a reference. The controller device utilizes the measured ambient and glare lights levels to control the reflectance level of the mirror. The response time of the controller to the measured light levels, including generating an output proportional to the difference between the sensed output of the accumulation device relative to the ambient reference level, is in the range of a fraction of a second.

Common integration elements are utilized in the various aspects of the current invention. For example, the light sensor levels are measured sequentially so that errors due to component variations correspond for both glare and ambient measurements, and track one another. This allows the use of mass-produced silicon sensors and avoids costly efforts to match components. This results in the achieving high dynamic range in the sensing of wide input light levels, utilizing commercial-off-the-shelf light sensors.

The derivation of the reflectance control output signal may be referenced to the ambient light levels from a forward facing and/or a rearward facing light sensor, or from a value obtained from the amount of light impinging on the rearward facing rearview mirror surface.

Due to the availability of various personal electronic devices, such as PDA operating systems and CPU processors, various multiple functions such as GPS navigation, blue tooth functions, etc., may be incorporated in a single device housed within the rearview mirror assembly.

The present invention thus provides a dimmable rearview mirror system incorporating a control that references the brightness of the rearward scene. The mirror reflectivity is adjusted to maintain an appropriate and comfortable intensity level of the light shining into the eyes of the user in response to the rearward scene brightness level.

DESCRIPTION OF THE DRAWINGS

For a better understanding of the present invention as well as other objects and further features thereof, reference is made to the following description which is to be read in conjunction with the accompanying drawing therein.

DESCRIPTION OF THE INVENTION

Figure 1:
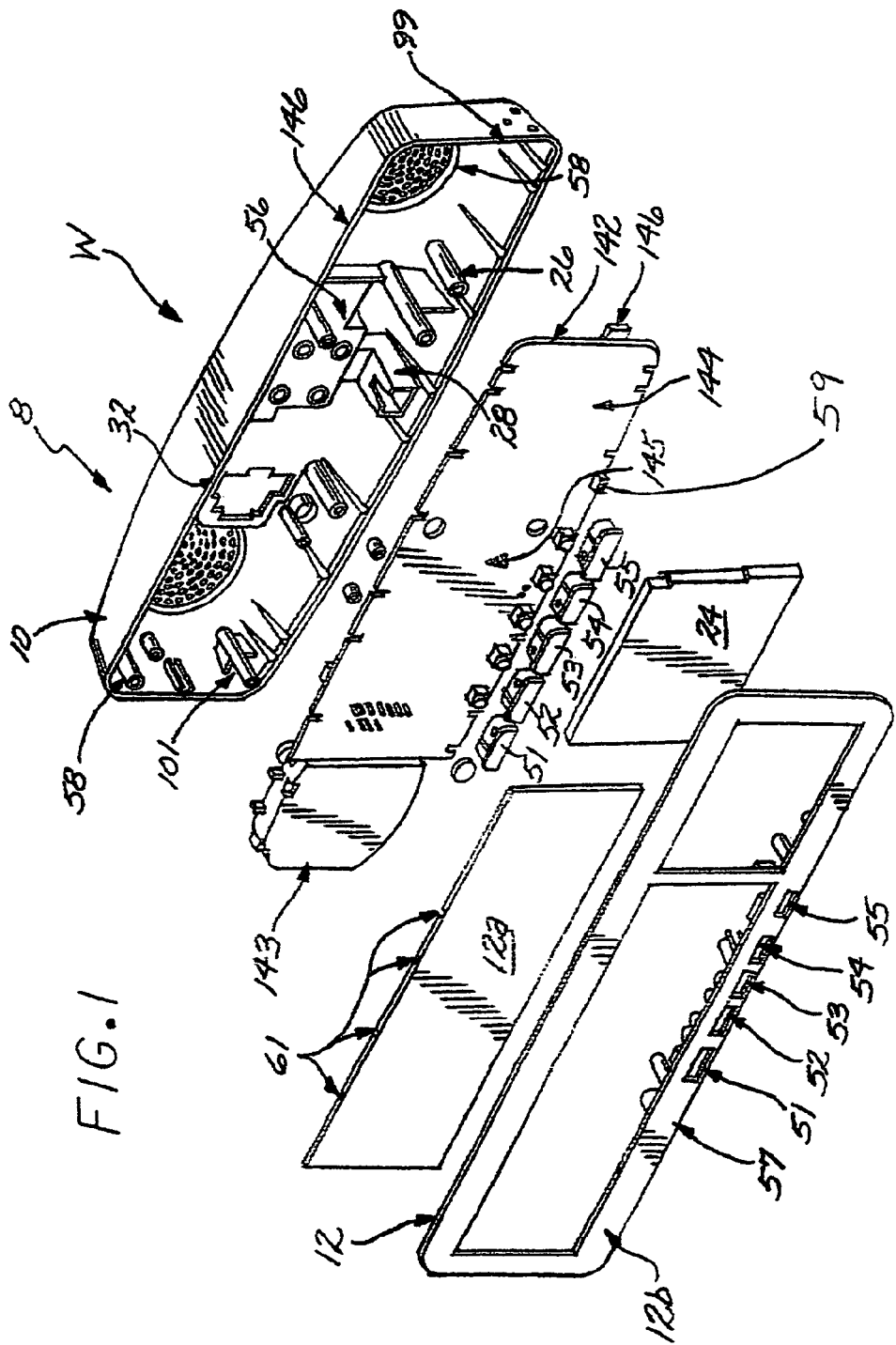
FIG. 1 is an assembly view of the autodimming mirror of the present invention.

FIG. 1 illustrates the mirror reflector assembly 8 of the present invention, and in particular, the rearview mirror support and information display assembly 10 for vehicles. Assembly 8 is designed to be secured to the front windshield of a vehicle below the interior roof, suitable for a rearview mirror 12 to be supported on assembly 10. Rearview mirror 12 comprises a dimmable reflective mirror element 12a housed in mirror housing 12b. In addition, mirror 12 contains a video display 24 positioned adjacent mirror 12, display 24, being utilized for display of navigational, alphanumeric, and camera images. Display 24 is removably fitted to the mirror backing and includes an information display area 22 incorporating display element 24 fitted thereon for conveying the aforementioned information to persons inside the vehicle. Display 24 also includes electrical circuitry for its operation, which circuitry includes electrical wiring 26 and a multi-connector 28 for connecting the display to the vehicle's electrical system.

As shown in FIG. 1, the vehicle operator is located so as to look outwardly through windshield W and is in position to view rearward images in the mirror element of mirror assembly 12. An instrument panel in the vehicle dashboard is positioned below the windshield W and contains a variety of conventional instruments and displays such as a speedometer, tachometer, fuel gauge, oil pressure gauge, and alternator voltage charging indicator, as well as other instruments such as a clock, radio, CD player, AUX port, SD card slot; heater and air conditioning controls, and so on, which is available to all persons in the vehicle. Positioning of the display 24 next to the viewing position of mirror assembly 12 has the advantage of maintaining an unobstructed view for the vehicle operator.

Fitted within housing 20 is a wiring harness including electrical wires/cables and connectors 28, 32 as well as printed circuit board (PCB) 142 containing electronic/electrical circuitry for operating the display 24 and/or other functions in the supported rearview mirror assembly 8. PCB 142 is adapted to be mounted on the front edges of interior walls 10 by means of tabs 99, 101 received in openings 146 (the tabs are connected by a cable having a length of approximately 125 mm to a microprocessor 145). PCB 142 contains the GPS 144 (PND function) and microprocessor 145 for the autodimming and power management functions, mounted within housing 10 via tabs within opening 146. The functioning of microprocessor 145 (Signetics CDP 1802; 8-bit microprocessor or an equivalent) is detailed in the flowchart shown in FIG 7. The left end of PCB 142 (as seen by the operator) is the SD card slot module 143 that stores digital map information for the vehicle navigation function. Five hard press (soft touch feel) buttons 51 (Volume on/off), 52 (Bluetooth), 53 (Power), 54 (Temperature), 55 (Guidepoint-GPS) are provided to the operator for selection of specific listed features. An auxiliary input 56, microphone 58, light sensor 59 and speakers are also provided. Two openings 58 are provided in the rear of housing 10 to allow egress of sound from the speaker unit, housed in module 143. Power button 53 functions in two modes, with a long press (pushing more than 3 seconds) turning off the device and with a short press controlling the autodimming function manually. With the power on, the default setting is the automatic mode of autodimming, controlled by the glare and light sensor 59. With a short press of the button 53, this action turns off the autodimming function when a user selects not to use this function.

In the voltage OFF condition, the incident light impinges on the polarizer film 80 is linearly polarized as it enters the TN-LCD liquid crystal layer 82 via front glass 81. The TN-LCD layer 82 rotates the polarization of the light by 90 degrees, and only allows light of the rotated polarization to be transmitted through the LCD layer. The light then is reflected from the aluminized back glass (84,86) and reverses path back to the front of the mirror. In the voltage off condition, the polarization of the reflected light matches the polarizer film, and the mirror is in the reflective, or light, condition.

For the voltage ON condition, the LCD layer does not cause the polarization to rotate and blocks transmission of the incident polarized light. Hence in this voltage condition the mirror is in the non-reflecting or dark condition.

Figure 3:
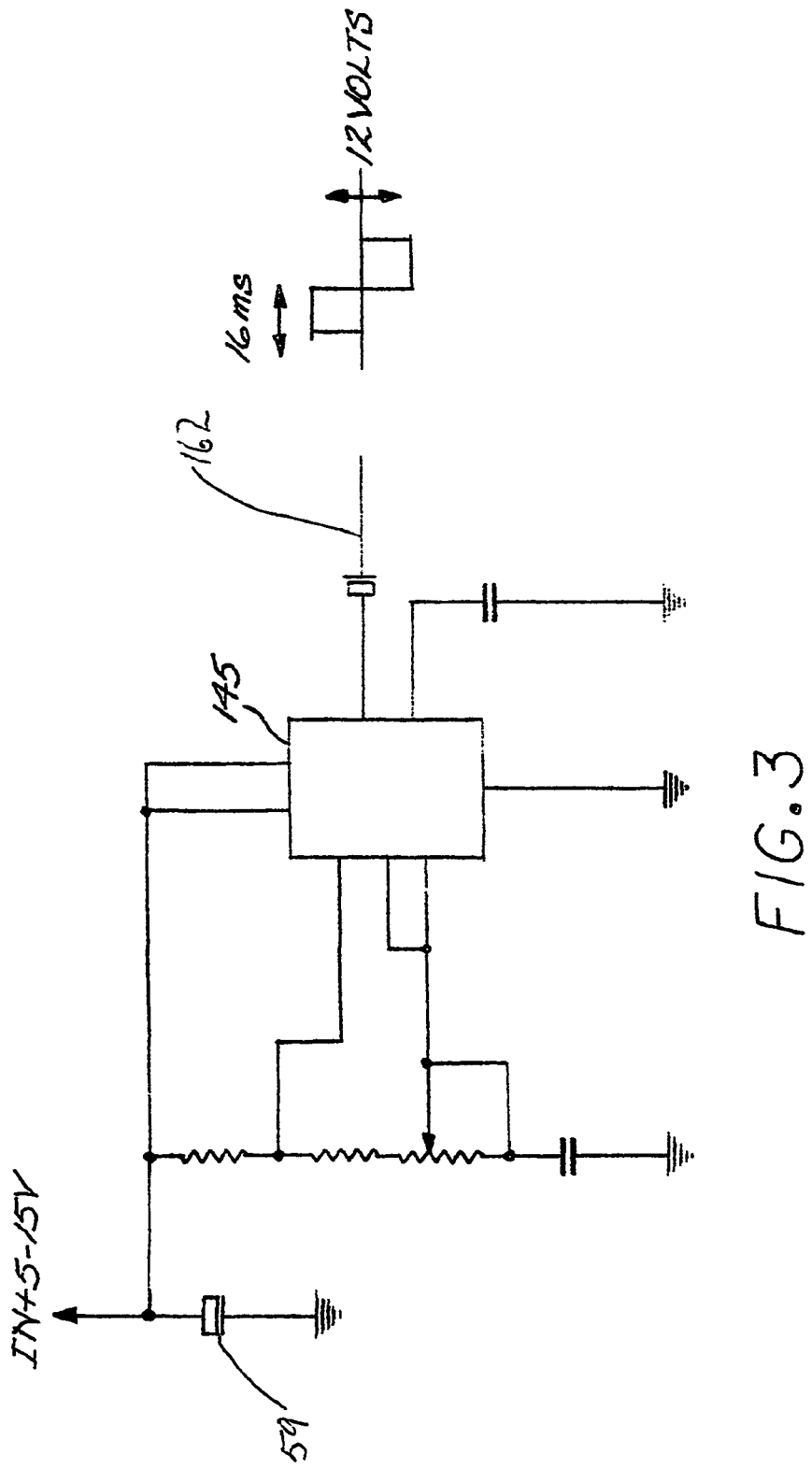
FIG. 3 is a circuit diagram showing the timing and voltage signals which control the dimming function of the mirror system of the present invention.

FIG. 3 shows the autodimming activation circuit which operates on the DC input voltage as regulated by the microprocessor 145, the voltage representing the intensity of the impinging exterior light level. This voltage adjusts the mirror reflectivity by generating a pulse output 162.

The input to the circuit is from the glare and ambient sensor 59 as a voltage waveform (labeled "IN+5-15 volts"). The input signal is split into five parts which are applied to pins 6, 2, 7, 4 and 8 of microprocessor) 145. The circuit operates on the level and shape of the input waveforms to produce an output square wave 162 whose peak to peak voltage is applied to the autodimming mirror to control the degree of dimming.

Figures 2A, 2B:
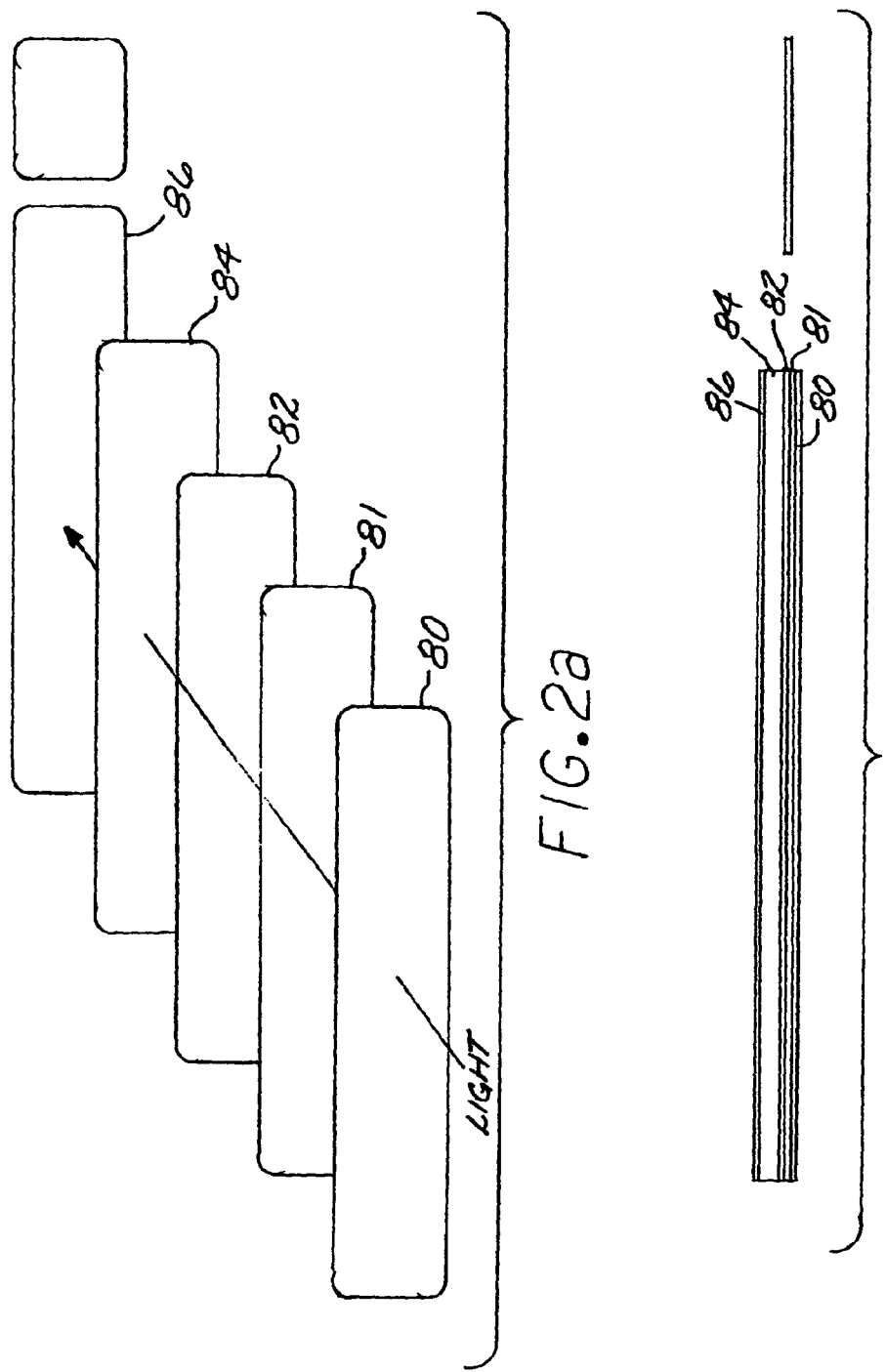
FIG. 2(*a*) is an exploded perspective view of the dimming mirror showing its sandwich construction and FIG. 2(*b*) is a top view of the assembled dimming mirror.

The output of the circuit (labeled "OUT" at the extreme right of FIG. 3) shows the voltage waveform that is applied relative to ground plane at four tabs located on the top edge of mirror 12a (indicated as reference number 61) of the conductive metalized reflective layer (i.e., aluminum layer 84 in the exploded view of FIG. 2a).

The mirror glass utilized in the autodimming mirror invention is commonly commercially available glass. The metalized reflection coatings for TN mirrors utilize aluminum. The LCD (liquid crystal) is commonly available and the same as is used for calculator displays, computer monitors, and similar applications. The polarized film 81 is a commercially available polarizer such as may be obtained in the open market for applications such as 3D movies.

Typical dimensions of the mirror components shown in FIG. 2 are as follows:
Polarizer film 80: 0.20 mm
Front glass 81: 0.05 mm
Liquid crystal layer 82: (thin, in nanometer range)
Aluminum Coating 84: (thin, in nanometer range)
Back glass 86: 0.05 mm
Overall length: 183.50 inches
Height: 57.60 inches
Width (depth): 2.60 mm The signal 162 is applied at 64Hz and voltage applied relative to the ground plane at tabs of the conductive metalized reflective layer (i.e. aluminum layer 84 shown in FIG. 2). Tabs 51-54 are located at several points around the mirror periphery.

Figure 4:
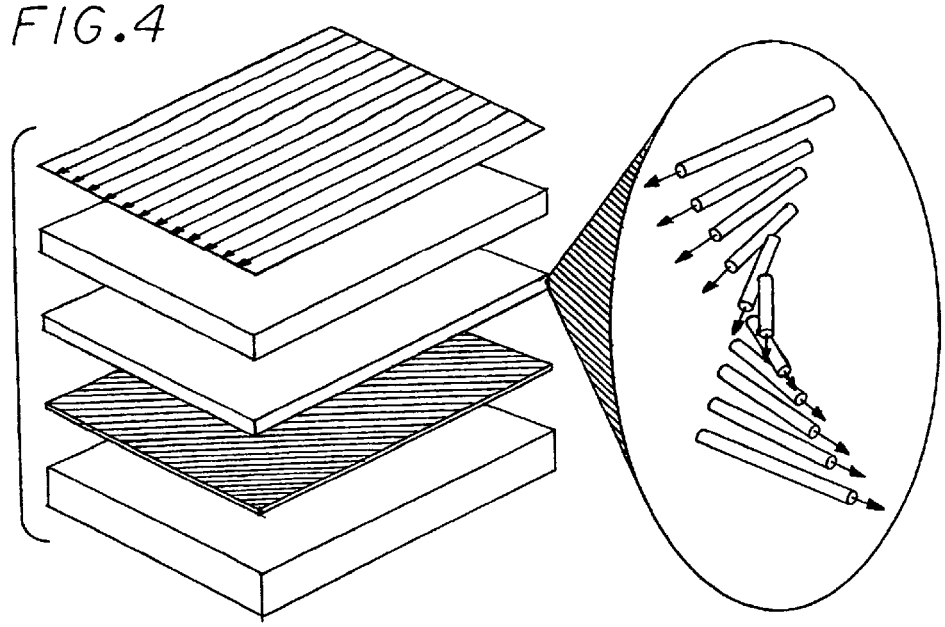
FIG. 4 is an exploded view diagram showing the liquid crystal display device of the present invention and a simplified representation of the liquid crystal molecules when the mirror is fully reflective (Voltage OFF)

The right side diagram in FIG. 4 illustrates the TN LCD mechanism in the "voltage on" condition. The diagram shows the anisotropic nematic liquid crystal molecules, which behave as electrical dipoles, where the orientation of the dipole in the "voltage on" condition is aligned perpendicular to substrates. In this condition the incident light is absorbed, and there is minimal reflectivity from the mirror surface, since the polarization of the reflected light is orthogonal to that of the polarizing sheet. Hence in the above (voltage off) condition the LCD is in the dimmed or absorbent state.

Figure 5:
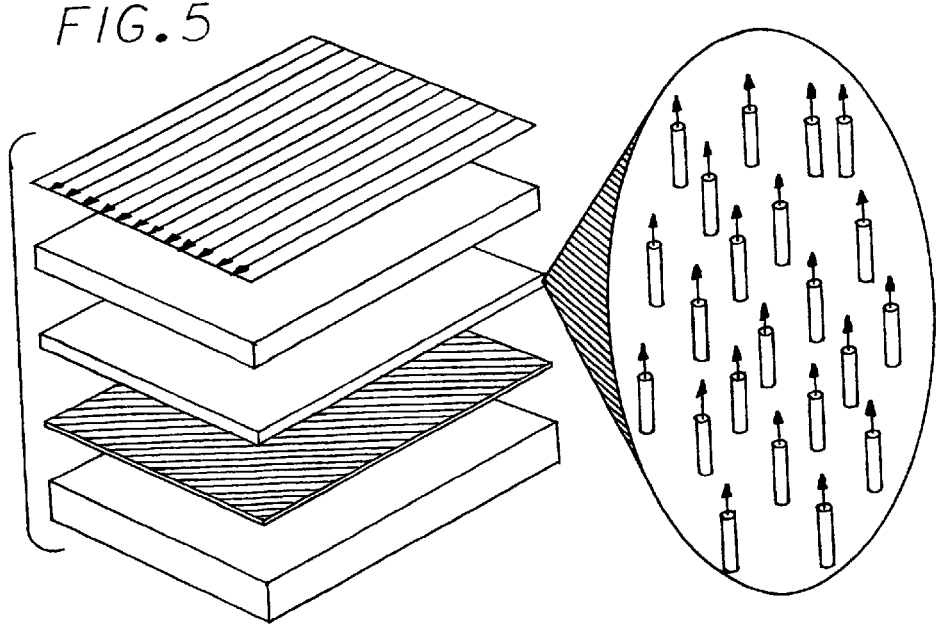
FIG. 5 is an exploded view diagram showing the layer construction of the liquid crystal display device of the present invention and simplified representation of the liquid crystal molecules when the mirror is dimmed (Voltage ON)

The right side diagram in FIG. 5 illustrates the TN LCD mechanism in the "voltage off" condition. The diagram shows the anisotropic nematic liquid crystal molecules, which behave as electrical dipoles, where the orientation of the dipole "twists" by 90 degrees from the top surface to the bottom surface, aligning with the respective direction of the electric fields at the two surfaces. The polarization of the incident light follows the polarization of the TN LCDs, so that in the above (voltage off) condition the LCD is in the reflective state.

Figure 6A:
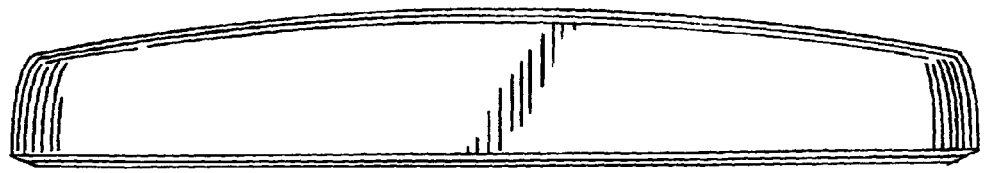
FIG. 6(a) shows a top view of the fully assembled auto dimming mirror of the present invention and FIG. 6(b) shows the front view thereof.
Figure 6B:
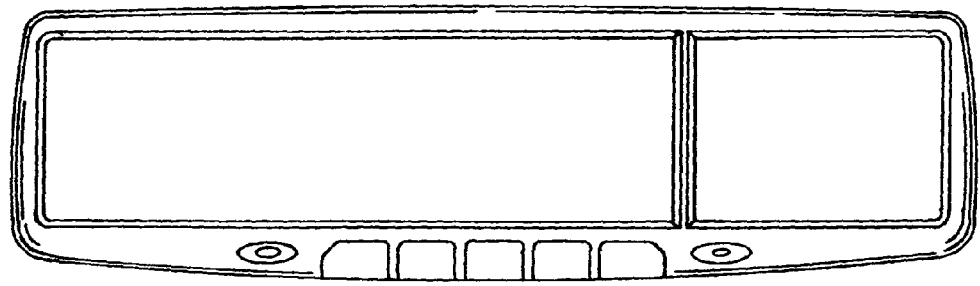

FIGS. 6(a) and 6(b) illustrate the top and front views, respectively, of the assembled autodimming mirror 12 of the present invention.

Figure 7:
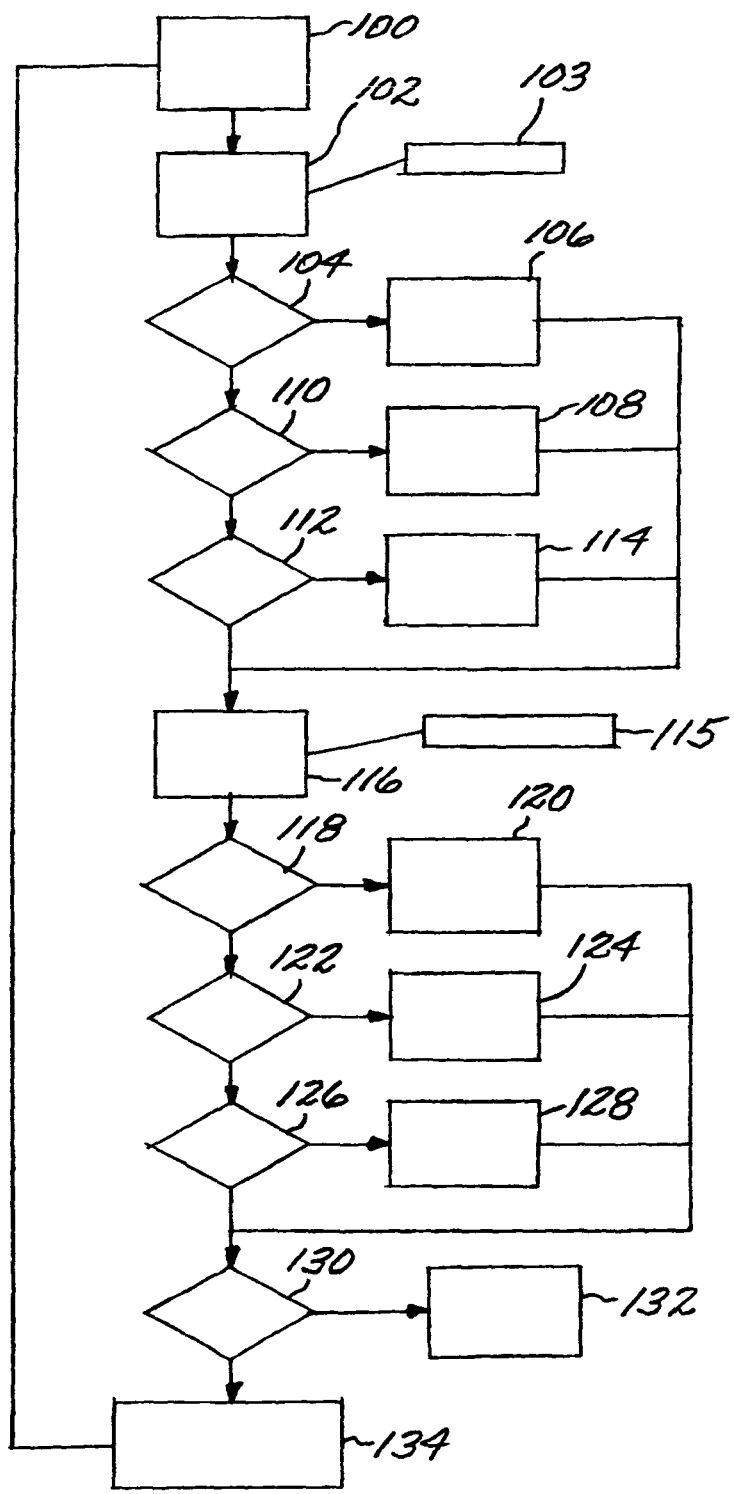
FIG. 7 shows the flowchart for a microprocessor utilized to control the autodimming function.

FIG. 7 is the flowchart for the 8-bit microprocessor unit 145 which controls the autodimming function. In particular, after performing an initialization function (block 100) the output from the back scanner (block 103) is read (block 102); if the value is greater than a first predetermined amount (block 104), the system enters into the high gain mode (block 106). If the read value is less than the predetermined amount, the system determines if the sensor output is greater than a second predetermined amount (block 110) and if so, the system enters into the mid-gain mode (block 108). If the system detects a value less than the second predetermined amount (block 110), the system determines if the sensor output is greater than a third predetermined value (block 112); if in the affirmative, the system enters the low gain mode (block 114). If the sensor output is less than the third predetermined value, the front sensor (element 115) reads the value read by a scanner (block 116). The same analysis on the signal from the back sensor (block 103) is performed on the signal from the front sensor (block 118, 120, 122, 124, 126 and 128). The output from the selected mode is compared (block 130) and if the value from the back sensor (element 103) is greater than the value from the front sensor (element 115), the output from the circuit shown in FIG. 3 is inhibited (block 132). If the output from the back sensor is less than the output from the front sensor, an output (PWM) is generated (box 134) and the initialization sequence (block 100) is restarted.

While the invention has been described with reference to its preferred embodiments, it will be understood by those skilled in the art that various changes may be made and equivalents may be substituted for elements thereof without departing from the true spirit and scope of the invention. In addition, many modifications may be made to adapt a particular situation or material to the teachings of the invention without departing from its essential teachings.

What is claimed is:

1. A reflective mirror system comprising:
an interior assembly having a variable reflectance element, said variable reflectance element including a liquid crystal layer disposed between a first substrate and a second substrate, said first substrate contacted by a polarizing film on its exterior side and said layer on the interior side of said first substrate, said second substrate having a reflector at its side contacted by said layer, wherein said reflector comprises a reflecting metal film wherein said interior mirror assembly comprises at least one light sensor; and a control system responsive to a predetermined light level sensed by at least said one light sensor, the mirror reflectance being adjustable by said control system.

2. The mirror assembly of claim 1, wherein said reflecting metal film is at least about 60 percent reflective to visible light incident thereon.

3. The mirror assembly of claim 1, further including circuitry associated with said light sensor, said circuitry comprising a current to frequency converter.

4. The mirror assembly of claim 1 wherein said light sensor comprises a silicon photo-sensor and associated circuitry commonly formed as a monolithic CMOS integrated circuit.

5. The mirror assembly of claim 1 wherein said control circuit comprises a charge accumulation device, a comparison function and a controller, said comparison function comparing an output of said charge accumulation device with a reference, said controller selectively connecting said ambient light sensor with said charge accumulation device.

6. The mirror assembly of claim 1 wherein said control circuit establishes a reflectance level of said reflecting metal film responsive to a ratio of a glare light value to an ambient light value.

7. The mirror assembly of claim 6, wherein said ratio of glare light value to ambient value is from about 0.01 to at least about 100, the mirror system reflectivity being programmable to all ratios of the glare light value between 0.01 and 100.

8. The mirror assembly of claim 6, wherein said control circuit establishes said reflectance level within a relatively linear value of said ratio of glare light value to ambient light value, said reflectance level being adjustable.

9. The mirror assembly of claim 1 wherein the mirror dimming function is initiated and adjusted by touch screen, toggle switch or said light sensor.

10. A reflective mirror assembly comprising a variable reflectance element, said reflective element having a front surface and a rear surface, said front surface being closer to a user than said rear surface;
wherein said reflective element comprises a mirror reflector that partially reflects light incident thereon; a light sensor system operable to sense ambient light and glare light incident at or near said reflective element; wherein said light sensor comprises a silicon photo-sensor and associated circuitry formed as an integrated circuit and wherein said glare light sensor comprises a silicon photo-sensor and associated circuitry formed as an integrated circuit and wherein said glare light sensor converts incident light to a signal processed by a microprocessor; a control circuit operable to establish a reflectance level of said reflective element, wherein said control circuit is responsive to light detected by at least one of said ambient light sensor and said glare light sensor; and wherein said control circuit establishes a reflectance level of said reflective element responsive to a ratio of a glare light value to a preselected ambient light value.

11. The mirror assembly of claim 10, wherein said control circuit establishes said reflectance level within a relatively linear value of said ratio of glare light value to ambient light value, said reflectance level being a programmable function of said ratio of glare light to ambient light value.

12. The rearview mirror assembly of claim 11, comprising means for compensating for temperature of said glare light sensor and said ambient light sensor, wherein said temperature compensation is responsive to a reference sensor not exposed to light.

* * * * *